Aug. 20, 1940.  E. BUSCHMANN  2,212,435

ESCAPEMENT MECHANISM FOR THE CARRIAGE OF A TYPEWRITER

Filed March 9, 1939  6 Sheets-Sheet 1

Inventor:
Eugen Buschmann
By Young, Emery & Thompson
Attorneys

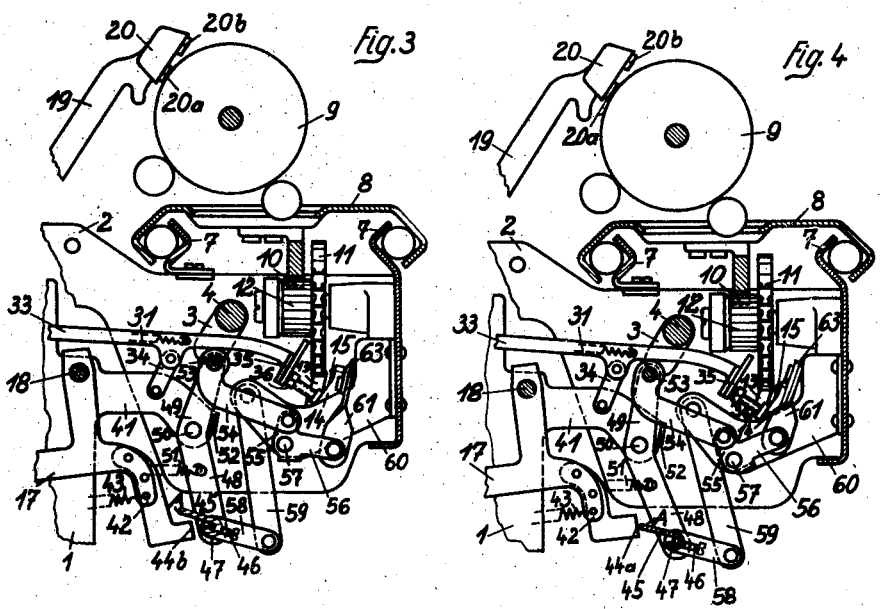
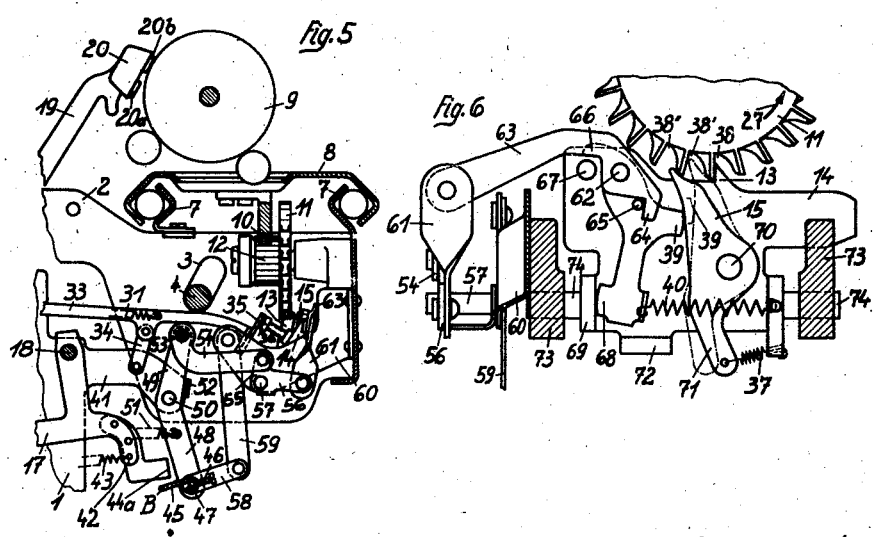

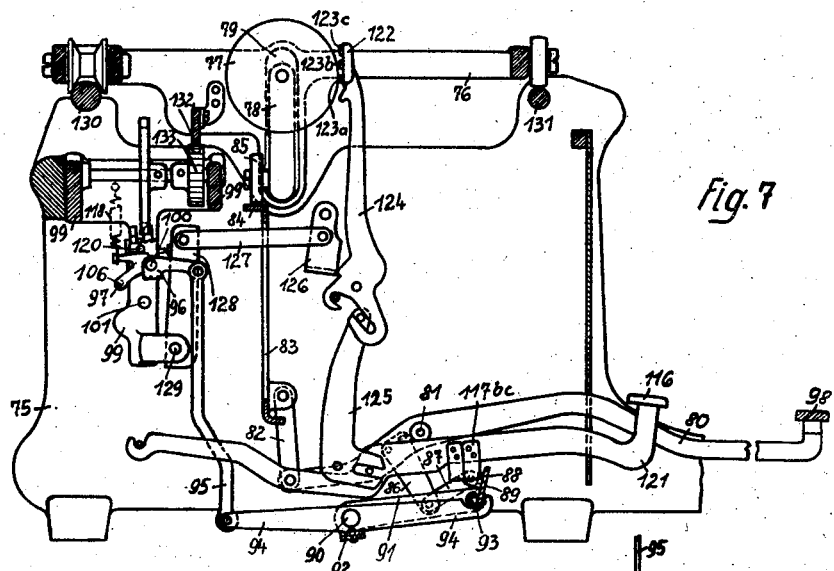
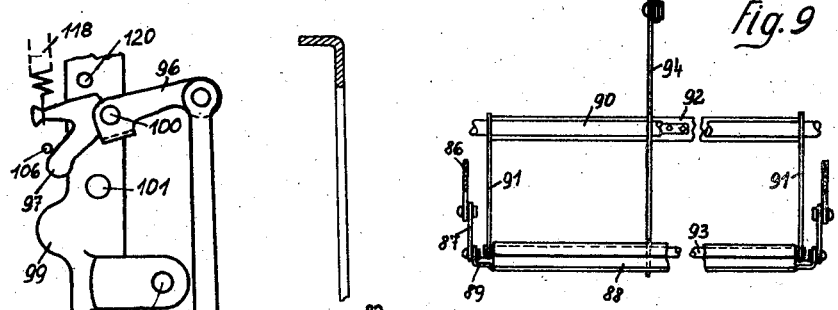
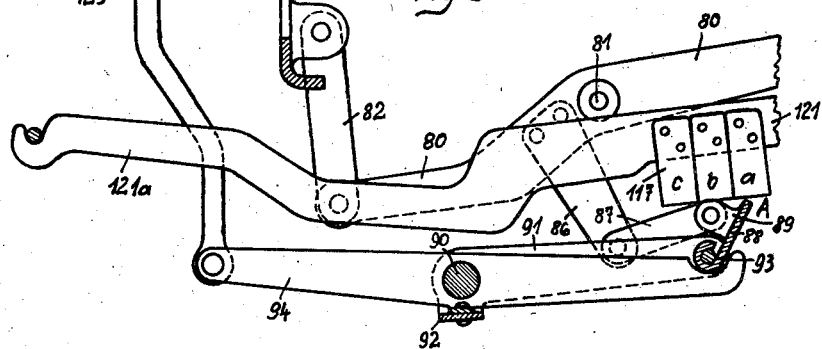

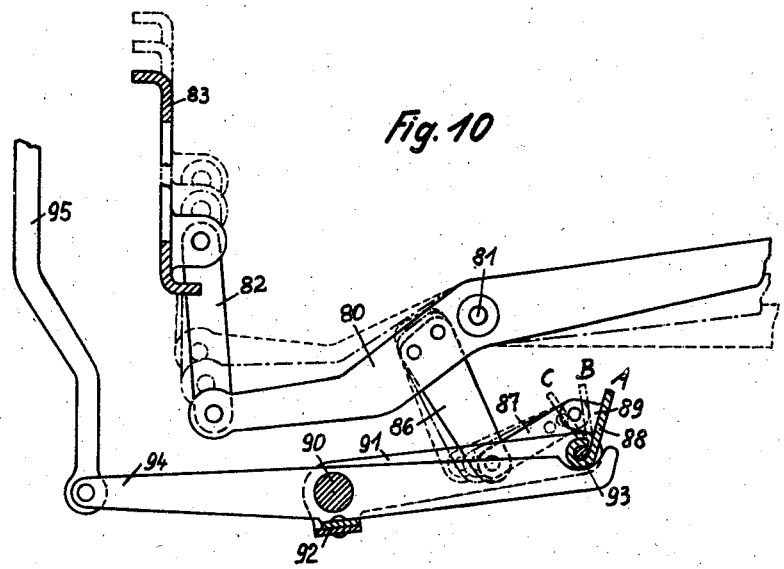
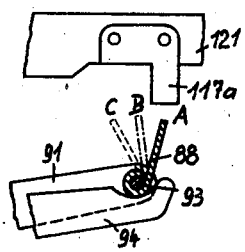 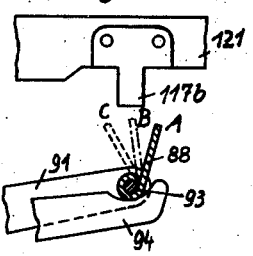 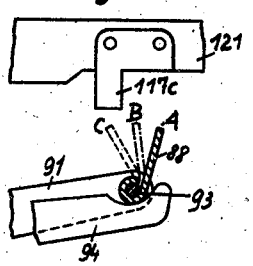
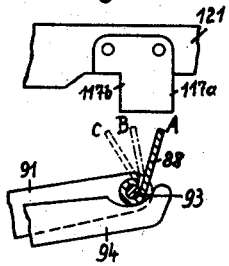 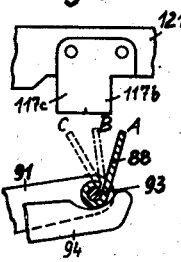 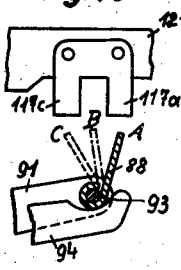 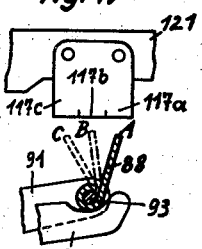
Inventor:
Eugen Buschmann
By Young, Emery & Thompson
Attorneys

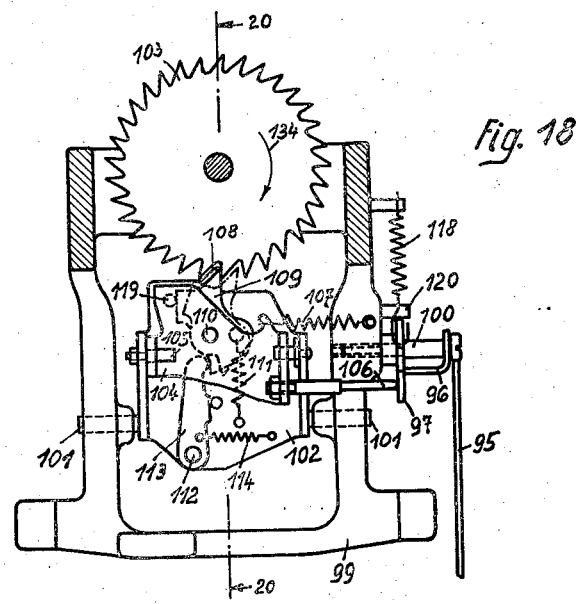

Aug. 20, 1940.   E. BUSCHMANN   2,212,435
ESCAPEMENT MECHANISM FOR THE CARRIAGE OF A TYPEWRITER
Filed March 9, 1939   6 Sheets-Sheet 6

Inventor:
Eugen Buschmann
By Young, Emery & Thompson
Attorneys

Patented Aug. 20, 1940

2,212,435

UNITED STATES PATENT OFFICE 2,212,435

ESCAPEMENT MECHANISM FOR THE CARRIAGE OF A TYPEWRITER

Eugen Buschmann, Chemnitz, Germany, assignor to Wanderer-Werke Aktiengesellschaft, Siegmar-Schonau, Germany Application March 9, 1939, Serial No. 260,852
In Germany March 10, 1938

10 Claims. (Cl. 197—84)

This invention relates to improvements in escapement mechanisms for the carriage of a typewriter, having a movable escapement pawl, which, in a carriage stepping operation, is momentarily disengaged from the teeth of the escapement wheel and performs under spring action a stroke of greater or lesser length according to the setting of an adjustable abutment, and a setting device for this abutment which can be set to different positions by a case shifting mechanism which conditions the machine for printing different types on a type carrier, and which setting device according to its setting, is acted upon during typing by extensions arranged in different positions on key actuated parts as described in U. S. application Serial No. 727,565, filed May 25, 1934.

The invention of the present application has for an object to improve the construction and operation of the escapement mechanism of said prior application and it consists in arranging the setting device directly opposite the extensions in such a manner that it is operable by the extensions themselves. Other objects and features of the invention will appear hereinafter.

Several constructional examples of the mechanism of the invention are shown in the accompanying drawings in which parts of the typewriter not concerned with the invention are omitted for clearness.

Figure 1:
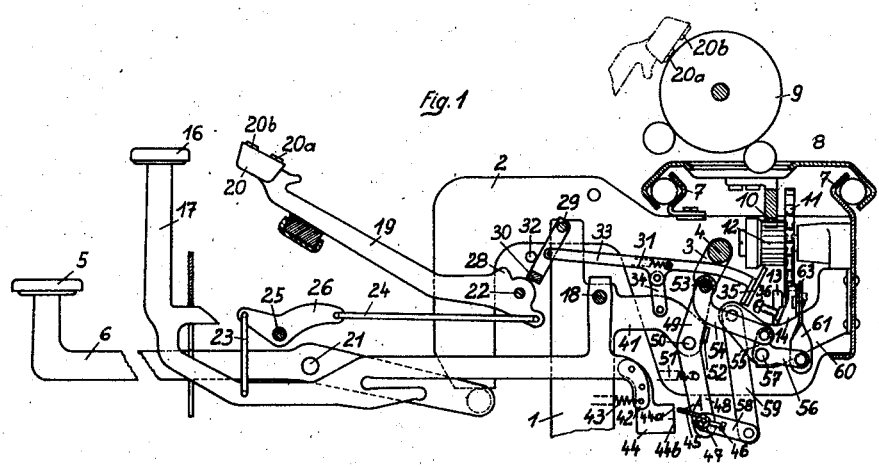
Figure 20:
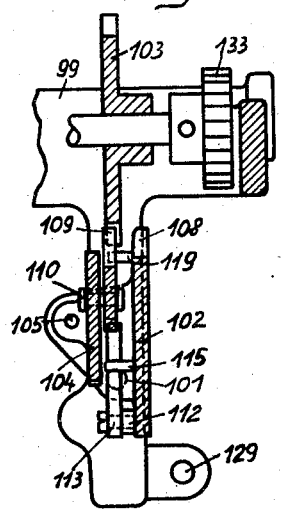
Figure 21:
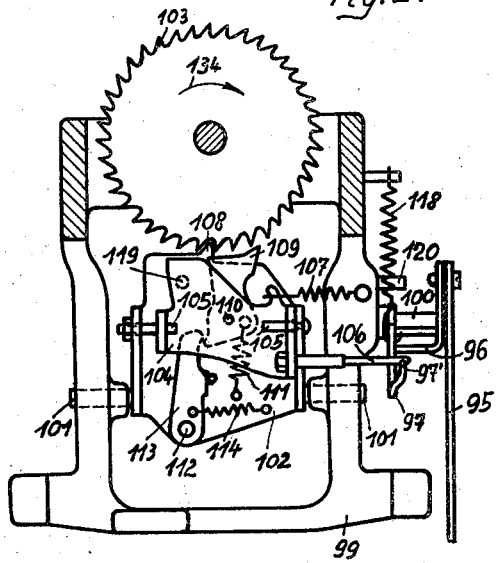

Figure 1 is a section through the typewriter with the parts in position of rest, Figs. 2 to 5 are similar views with the parts shown in different operating positions, Figs. 3 to 5 including merely the right hand side, Fig. 6 is a partial rear view of the typewriter of Fig. 1, Fig. 7 is a section through a modified form of the invention applied to a typewriter with more than two case shift positions, Figs. 8 to 17 are detail views of the modification of Fig. 7, Fig. 18 is a rear view of the escapement mechanism according to Fig. 7 with the parts in position of rest, Fig. 19 is a rear view corresponding to Fig. 18 with the parts shown positioned in double width spacing, Fig. 20 is a section on line 20—20 of Fig. 18, Fig. 21 is a rear view corresponding to Fig. 18 of a further construction of the escapement for more than two different spacings, and Figs. 22 to 26 are detail views of the construction of Fig. 21.

In the example shown in Figs. 1 to 6, the frame 1 of a small or portable typewriter supports a case shift member 2 by means of a slot guide 3 engaging a pin 4 in the frame 1.

Figure 2:
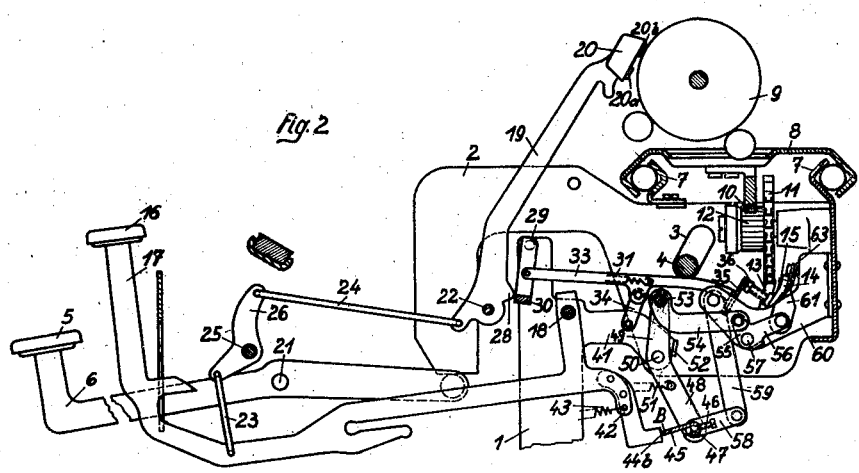

The case shift member, by depressing a key 5 on the case shift lever 6 pivotally mounted at 21 on the frame, is moved from the case position shown in Fig. 1 into the case position shown in Fig. 2. The case shift member 2 is provided with carriage guides 7 in which the paper carriage 8 carrying the platen roller 9 is longitudinally movable. On actuating the case shift key 5, the case shift member 2 and the platen roller 9 are raised or lowered so that during typing the upper or lower type of the types 20a, 20b on the type lever 19 is caused to print. The paper carriage 8 has a rack 10 attached thereto which engages a toothed wheel 12 fixed to the escapement wheel 11, and during typing the carriage is advanced stepwise in longitudinal direction by the carriage spring, not shown.

The stepwise operation of the escapement wheel 11 is effected in the usual manner by rocking an escapement member 14 about its axis 74 (Fig. 6). The escapement member 14 is provided with a fixed pawl 13 and a movable pawl 15, the latter being pivoted to the escapement member 14 at 70. On striking a key 16, the key lever 17 is rocked about the common axis 18 of the key levers 17, against the action of a spring 43 attached to the rear end 42 of the key lever 17. The lever 19 has a type head 20 carrying the types 20a and 20b, and is pivoted about an axis 22. The type lever 19 is actuated by the key lever 17 through links 23, 24 and a lever 26 pivoted on a rod 25. The type lever 19 has a nose 28 which during a printing movement of the lever 19, moves a universal bar 30, pivotable about an axis 29, away from a stop 32 (Fig. 1) against the action of a spring 31. The movement of the universal bar 30 is transmitted to a bar 33 jointed by means of a link 34 to the machine frame 1 and thence from a projection 35 on the bar 33 to a bolt 36 on the escapement member 14. By these means the movable escapement pawl 15 is moved out of, and the fixed escapement pawl 13 is moved into, teeth gaps 38 of the escapement wheel 11, Fig. 6.

The movable escapement pawl 15, which is brought out of engagement, is turned by the action of a spring 37, as shown in Fig. 6, into a position in which it lies in front of one of the next teeth gaps 38' or 38" of the escapement wheel 11. The end position of the movable escapement pawl 15 and consequently the selection of the toothed gap 38', 38" to be entered thereby, according to the desired width of spacing step of the paper carriage mechanism, is determined by an adjustable abutment 39 against which the movable pawl 15 is held by the action of the spring 37. This abutment 39, in the position corresponding to the smallest movement of the movable pawl 15, is held by a spring 40 against a stop pin 67. The spring 40 is stronger than the spring 37 acting upon the movable escapement pawl 15.

The adjustable abutment 39 for the movable escapement pawl 15 is mounted on the escapement member 14 by means of a pivot 62. On this pivot 62 on the escapement member 14 there is also supported a rock lever 63 which effects in manner to be described subsequently, the shifting of the abutment 39 against the action of its spring 40, by means of a heel 64 engaging a pin 65 on the abutment 39. In the double or two step spacing position the adjustable abutment 39 is limited in its movement by engagement of a lug 68 thereon against a bent portion 69 of the escapement member 14.

In position of rest, that is when the paper carriage 8 is standing still, the movable pawl 15 has its arm 71 which engages the spring 37, in contact with a stop lug 72. In this position the movable escapement pawl 15 is held by the escapement wheel 11, which under the influence of the carriage spring, not shown, acting in the direction of the arrow 27, tends to turn the movable pawl 15 against the action of its spring 37, in right-hand direction, Fig. 6, about the pivot 70. The escapement member 14 is pivotally mounted on stub pins 74 supported in arms 73 of the case shift member 2.

In order to provide in both case shift positions of the paper carriage 8, not only for the usual advance step corresponding to the width of the type characters, but also for a step of double width, four different key lever groups are provided according to this modification of the invention. These groups are determined by the nature and arrangement of extensions 44a, 44b, which can be mounted on the rear ends 42 of the key levers 17 of the several groups. These extensions 44a, 44b influence during the typing and in dependence on the case shift position of the paper carriage 8, the adjustable abutment 39 for the movable escapement pawl 15 as will be hereinafter described.

To provide for a shifting of the abutment 39 from the chain-dotted line position shown in Fig. 6 into the full line position in which the movable escapement pawl moves through a greater stroke and gives an advance of double width, whichever key 16 is operated and in either case position of the platen roller 9, upon printing the types associated with these keys, there is arranged a setting member 45 transversely to all the key lever ends 42. The setting member 45 is attached by screws 46 to a shaft 47 which can be adjusted by means of a setting arm 58 to different angular positions in arms 48 of a pair of two armed levers 48, 49. The levers 48, 49 together with the shaft 47, form a rocking frame pivoted about an axis 50 in branches 41 of the machine frame 1 and held by a spring 51 against a projection 52 of the frame 1. Movement of the rocking frame 47, 48, 49, against the action of the spring 51 is transmitted to the abutment 39 through a rod 53 connected to the arms 49, a link 54 jointed to said rod, a bell-crank lever 55, 56 pivoted at 57 to a branch 60 of the case shift member 2, a connecting rod 61 and an arm 63 jointed to said rod and carrying the heel 64 which co-operates with pin 65 on the abutment 39, Fig. 6. Such a movement of the rocking frame 47, 48, 49 takes place when during typing an extension 44a, 44b encounters the correspondingly adjusting setting member 45.

The adjusting of the setting member 45 in dependency on the case shift position is effected through a setting arm 58 by means of a link 59 jointed to said arm and to the branch 60 of the case shift member 2. In the lower case position of the member 2 and platen roller 9, in which the types 20a are in printing positions, Figs. 1, 3 and 4, the setting member 45 is adjusted to the position A. In the upper case position in which the type 20b is in printing position, Figs. 2 and 5, the setting member 45 is in the position B, owing to the turning of the shaft 47 which takes place on raising the case shift member 2, by means of the parts 60, 59, 58. Owing to the jointed arrangement of the intermediate member 54, any interference between the rocking frame 47, 48, 49 pivoted on the fixed frame branch 41, and the bell-crank lever 55, 56 pivoted in the case shift member 2, is avoided during a case shift operation.

On striking keys for typing characters of ordinary width the setting member 45 is not influenced from the key lever. The corresponding key levers 17 of this lever group are not provided with extensions. The escapement device for the paper carriage 8 in this instance is operated in the usual manner so that the paper carriage 8 in both case positions is advanced by a single step. This is effected in the manner that the escapement member 14 is moved by the universal bar 30 in the above described manner, and the movable pawl 15 is turned by its spring 37 into the position indicated in Fig. 6 in broken lines.

When keys of type characters of greater width are operated the setting member 45 according to its setting in the position A or B, and to the arrangement of the extensions 44a, 44b on the key lever ends 42, is rocked together with the rocking frame 47, 48, 49, about the axis 50, whereby an advance step of double width is made possible owing to the described adjustment of the abutment 39.

By providing an extension 44a on the end 42 of a key lever 17, there is effected an operation of the setting member 45 during typing only in its position A (Fig. 4), that is an advance step of double width is effected only when the lower type 20a of the type lever associated with this key is in printing position. In the position B of the setting member 45 (Fig. 5), the extension 44a passes over the setting member 45 when the key is operated, without affecting the same. Hence in printing the upper type 20b of the type lever associated with this key, there takes place only a single width advance step.

By providing an extension 44b actuation of the setting member 45 takes place upon striking the corresponding key, only in the position B (Fig. 2), that is, an escapement step of double width takes place only when the upper type 20b of the associated type lever is in printing position. In the position A (Fig. 3), the setting member 45 is not influenced by the extension 44b during typing, so that in typing with the lower type 20a, only an escapement step of single width takes place. In order to obtain an escapement step of double width in both case positions of the case shift member (2) and the platen roller 9, that is both in the position A and the position B of the setting member 45, when operating certain keys 16, the ends 42 of the associated key levers 17 are provided with both extensions 44a and extensions 44b. The arrangement may be such that one of each extensions 44a and 44b may be attached to the associated key lever end 42. There may, however, be provided a single abutment member 44 which combines the function of the two abutment members 44a and 44b (Fig. 1).

The extensions are suitably attached to the key lever ends 42 by screws, rivets or like connections, so that they can at any time be removed and exchanged.

The number of key lever groups and corresponding variability in the extensions 44 is obviously increased either when more than two step widths or more than two case shift positions of the paper carriage 8 are provided. The arrangement of the different extensions 44a and 44b and their distribution on the several key levers 17 of a group can be effected as desired according to the desired keyboard without modifying the basic construction of the machine. Case shifts can easily be provided in the finished machine when a different keyboard or type arrangement is desired, because it is only necessary to change the kind of extensions 44 mounted on the rear ends 42 of the several key levers 17, for this purpose.

In the modification of Figs. 7 to 20 the invention is so applied to a typewriter of a different kind. This machine has a frame 75 in which a paper carriage 76 is longitudinally guided on rails 130, 131. The paper carriage 76 carries the platen roller 77 which is guided by means of slide cheeks 78 in guide slot 79 in the frame of the paper carriage 76. The case shift movement of the platen 77 is effected in known manner by depressing one of the two case shift levers 80 which are pivoted on pins 81 in the side parts of the machine frame 75. At the free end of each case shift lever 80 there is jointed a link 82 jointed to the case shift frame 83 and which raises the same upon depression of the case shift key 98. In this manner and through the medium of a rail 84 mounted on the case shift frame 83 and a roller 85, the platen roller 77 on the paper carriage 76 is raised from the lower position shown in Fig. 7 in which the type 123a of the type lever 124 is in printing position, into one or another higher position in which one of the other types 123b, 123c comes into printing position.

To the machine frame 75 there is attached a bracket 99 in which an escapement member 102 is mounted on pivots 101 (Figs 7, 18, 19 and 20) and which can rock transversely to the plane of rotation of an escapement wheel 103. The escapement member 102 has a pawl carrier 104 slidably engaging a guide pin 105 on said member. The pawl carrier 104 to which the movable pawl 109 is pivoted at 110, is provided with a locking pin 106 which normally (Figs. 7 and 18) bears against a stop 97 and prevents longitudinal movement of the pawl carrier 104 and the movable pawl 109 in the operative direction to the right, under the action of spring 107 attached to the pawl carrier 104 (Fig. 18).

In the position of rest of the paper carriage 76 the carriage spring not shown, operating through a rack 132 mounted on the paper carriage and a pinion 133, engaging said rack and rotating with the escapement wheel 103, rotates the latter in the direction of the arrow 134 (Figs. 18 and 19). The movable pawl 109 engaging the escapement wheel 103 is thereby turned about its pivot 110 in the pawl carrier 104 against the action of its spring 111 and in left hand direction (Fig. 18), and is held in engagement with a stop pin 119 also mounted in the pawl carrier 104. By this action of the escapement wheel 103 under the force of the carriage spring, upon the movable pawl 109, the pawl carrier 104 is held in its extreme left hand position (Fig. 18) on its guide pins 105, against the action of the spring 107.

The advance of the paper carriage 76 is effected in the usual way when the type levers 124 are rocked by means of intermediate levers 125 when the type keys 116 are struck. In this operation, by means of a universal bar 126, connecting rod 127 and a lever 128 pivoted at 129 in the bracket 99, the escapement member 102 is rotated about its pivots 101 from the position of Fig. 20 into the position of Fig. 7. During the rocking of the escapement member 102 the escapement tooth 108 fixed thereto enters the same tooth gap of the escapement wheel 103 which the movable pawl 109 has just left. The movable pawl 109 under the action of the spring 111 then rocks to a position in which it bears against a striker lever 113 pivoted at 112 to the ecapement member 102, which lever 113 is held by a stronger spring 114 against a stop pin 115 also mounted on the escapement member 102, and in the position of the pawl carrier 104 shown in Fig. 18 the rocking movement of the movable pawl 109 is limited to one tooth gap distance of the escapement wheel 103, in the broken line position.

The movable pawl 109, on return rocking of the escapement member 102 in right hand direction (Figs. 7 and 18) enters the tooth gap of the escapement wheel 103 now opposite thereto and is turned by the force of the carriage spring from one of the teeth of the escapement wheel 103 against a limit stop 119 (Fig. 18), the escapement wheel 103 and the paper carriage 76 moving one step. During the termination of the advancing step the type drive means 116, 121, 125, 124 find themselves again in the return path from the striking position of Fig. 7 into the position of rest. To make possible a movement of the movable escapement pawl 109 after its disengagement from the escapement wheel 103 through more than one tooth pitch of the escapement wheel 103, the stop 97 against which the locking pin 106 of the pawl carrier 104 rests, is slidably arranged. For this purpose the stop 97 is mounted on a member 96 which is pivoted about an axis 100 in the bracket 99 against the action of a spring 118. The spring 118 holds the member 96 normally in the position limited by a pin 120 shown in Figs. 7, 8, 22 and 23 and in which the stop 97 prevents shifting of the locking pin 106, and therefore the pawl carrier 104 with the movable escapement pawl 109, to the right (Fig. 18).

The rocking of the stop 97 from its locking position of Figs. 7 or 18 into a position which frees the movement of the pawl carrier 104, as shown in Figs. 8 or 19, takes place upon striking certain type keys 116 by means of the extensions 117a, 117b, 117c, arranged on the associated key levers 121, which extensions according to their nature and arrangement act upon the setting member 88 the construction and arrangement of which will be hereinafter described. The stop 97 when in the position of Figs. 8 or 19 frees a path for the locking pin 106 of the pawl carrier 104, whereby after the disengagement of the movable escapement 109 from the teeth of the escapement wheel 103, the pawl carrier 104 follows the pull of the spring 107, by means of a longitudinal movement on the guide pins 105, and the movable pawl 109 is enabled, owing to the carrying along of its pivot pin 110 by the pawl carrier 104, to effect a larger locking movement in the right hand direction (Fig. 19) than previously, as far as the striking lever 113. The total rocking of the movable pawl 109 about its pivot 110 may amount for example to the width of two tooth points of the ecapement wheel 103 so that the paper carriage 76 in this case performs an advance step of double width upon actuation of a corresponding type key 116.

The setting member 88 is supported by a rod 93 movably mounted in rocking arms 91 and lies transverse to all the key levers 121 and below them. The rocking arms 91 are freely movable about an axis 90 (Figs. 8 and 9) and are also connected to each other by a bail 92. To the bail is attached a lever 94 which bears against the setting member 88 from below and guides the same without preventing its movement about the axis 93. The rocker arms 91, together with the bail 92, the lever 94 and the pivot rod 93 of the setting member 88 constitute a supporting frame pivotable about the axis 90. The free arm of the lever 94 is jointed to a link 95 and the latter to an arm of the pivoted member 96, so that when the supporting frame 91 to 94 is rocked by means of the key levers 121 acting through the setting member 88, the stop 97 on the pivoted member 96 is turned to the left (Fig. 7).

The setting of the member 88 is controlled through the links 86, 87 by the case shift lever 80, and is dependent on the case position of the platen 77. As shown in full lines in Fig. 10 the said member 88, in the lower position of the case shift frame 83 and therefore of the platen roller 77, is in the position designated A. In this position of the platen roller 77 shown in Fig. 7, when a type lever 124 is operated, the lower type 123a effects printing. The setting member 88 is in the broken line position B when an intermediate case position of the frame 83 and the platen 77 is set, and in the broken line position C when an upper case position is set (Fig. 10). In the middle or upper case position of the platen roller 77 upon operating the type bars 124, the middle types 123b or the upper type 123c effect printing.

In order to determine for each type character 123a, 123b, 123c, of each individual type lever 124, in simple manner, the necessary width of advance step of the carriage, the said member 88 is arranged directly opposite the extensions 117a, 117b, 117c which are preferably exchangeably mounted on the key levers 121 so that the setting member 88 upon depression of a key 116 is turned into the position A, B or C or in several of these positions according to the arrangement of the extensions on the corresponding key lever 121, this movement of the setting member 88 being accomplished by its supporting frame 91 to 94 about the axis 90, whereby in the above described manner an advance step of greater width is effected.

As appears from the illustration in Figs. 11 to 17, the extensions 117a, 117b, 117c are arranged according to the possible positions A, B, C of the setting member 88, which extensions can act on said member on depression of the associated key lever 121 only in the proper position of the said member. The extension 117a for example is effective upon the setting member 88 only in the position A of the member, and in the positions B and C passes over the setting member 88 upon depression of the corresponding key lever 121. By arrangement of more than one extension on a key lever 121 (Figs. 14 to 17) it is possible to influence the setting member 88 on depressing the associated key lever 121 in more than one setting of the member 88.

The extensions 117a, 117b, 117c and their combinations as shown in Figs. 11 to 17, may consist of suitably formed elements which may be attached in any suitable member to the several key levers 121. However, as shown in Figs. 7 and 8 individual similarly formed actuator parts 117 may be attached in different positions and in different combinations to the key levers 121.

The advance step widths of the paper carriage made possible with the previously described mechanism of Figs. 11 to 17 in the different case positions of the platen roller 77 or of the setting member 88, can be seen from the following table.

| In position | A | B | C |
| --- | --- | --- | --- |
| Figure 11 | Double | Single | Single. |
| Figure 12 | Single | Double | Do. |
| Figure 13 | do | Single | Double. |
| Figure 14 | Double | Double | Single. |
| Figure 15 | Single | do | Double. |
| Figure 16 | Double | Single | Do. |
| Figure 17 | do | Double | Do. |

The inventive idea can obviously be further applied in different ways for example when additional width of advance step of the paper carriage or additional case shift positions of the platen roller are required, or when a type lever segment or other case shift device is used.

Figs. 21 to 26 illustrate such another modification in a typewriter of a kind shown in Figs. 7 to 20. In this case an additional or triple width of advance step is provided. The stop 97 on the rocker member 96 is provided with a notch 97'. This provides stop members 97, 97' forming limit stops for the locking pin 106 on the pawl carrier 104, permitting displacements of different magnitude of the pawl carrier 104 on the guide pins 105, whereby the movable escapement pawl 109 after rocking out of engagement with the escapement wheel 103 can effect strokes of more than two different lengths about the pivot 110, up to the stop lever 113.

The movable escapement pawl as before is rocked a single step corresponding to the further movement of the escapement wheel 103 through a single tooth pitch, when the shift of the setting member 104 in the direction of action of the spring 107 is limited by striking of the pin 106 against the stop 97.

If the pivoted member 96 is turned by an amount which brings the stop notch 97' into the path of movement of the locking pin 106 (Fig. 23), then when the movable pawl 109 disengages the escapement wheel 103, the pawl carrier 104 is moved by the spring 107 to such a degree that the locking pin 106 bears against the stop notch 97'. The stroke of the movable escapement pawl 109 up to the striker lever 113 is thereby increased so that the movable pawl 109 advances by two tooth pitches of the escapement wheel 103.

Figure 22:
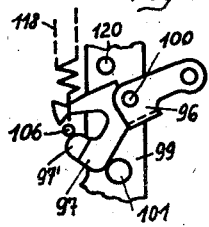
Figure 23:
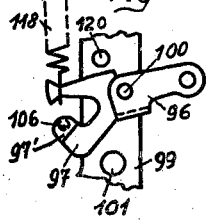

In the case of a greater rocking of the member 96 the stop notch 97' also moves out of the path of the locking pin 106 (Figs. 21 and 22). The pawl carrier 104, when the movable pawl 109 disengages the escapement wheel 103 is moved by the spring 107 until it strikes the limit stop on the escapement member 102.

In this case the movable pawl 109 is swung to such an extent that it jumps two tooth gaps of the ratchet wheel 103, so that the ratchet wheel 103, on re-engagement of the movable pawl 109, is advanced by a distance corresponding to triple spacing.

Figure 24:
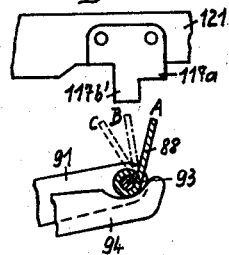
Figure 25:
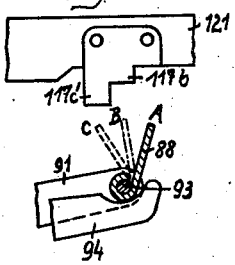
Figure 26:
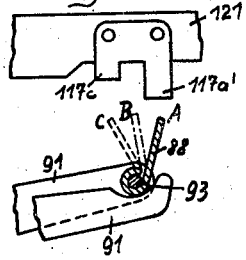

The rocking of the member 96 by such amounts of different magnitude is obtained by the arrangement opposite the setting member 88 of stepped extensions 117a, 117b, 117c, 117a', 117b', 117c' which cause different movements of different magnitude of the setting member 88 and of the frame 91 to 94, and therefore of the pivoted member 96. Three selected combinations of extensions 117a, 117b, 117c, 117a', 117b', 117c' are shown by way of example in Figs. 24 to 26. In conjunction with the different case positions of the platen roller 77 or of the setting member 88 for the particular key lever 121 in question, the following advance step widths of the paper carriage 76 are obtained:

| In position | A | B | C |
|---|---|---|---|
| Figure 24 | Double | Triple | Single. |
| Figure 25 | Single | Double | Triple. |
| Figure 26 | Triple | Single | Double. |

It will be seen that in this manner an extraordinary large number of combinations of different advance steps is obtained and these positions are possible for each single key.

I claim as my invention:

1. In a typewriter having a machine frame, a paper carriage, type carriers with different types thereon, key-actuated parts for operating said type carriers, and means for case shifting the machine to print different types; a paper carriage escapement mechanism comprising an escapement wheel, a rocking spacing device carrying escapement pawls co-operating with said wheel, one of said pawls being movable to control the spacing distance, an adjustable abutment determining the movement of said pawl into different positions corresponding to different spacing distances, a plurality of groups of actuator parts mounted on selected key-actuated parts, and setting means operatively connected with the adjustable abutment and with said case shifting means, said setting means comprising a single member movable, during case shifting without changing the position of the abutment, into a plurality of operative positions relatively to all the actuator parts of said groups, said positions being such that in at least one of them the member is contacted by one of said actuator parts upon actuation of the corresponding key-actuated part, whereby the single member follows the movement of said contacting actuator part and changes the position of said abutment correspondingly.

2. A typewriter according to claim 1, in which the single setting member consists of a rail arranged in such a manner as to rock about a longitudinal axis, said rail being operatively connected to parts of the machine moved when the case shifting operation takes place, causing the rail to be rocked to different case shift determined positions.

3. A typewriter according to claim 1, in which the single setting member consists of a rail which performs a rocking movement during a case shift operation of the machine, and in which a frame is provided in which the setting member is pivotally mounted, said frame moving along with the setting member during the drive of the setting member by the actuator parts.

4. A typewriter according to claim 1, in which the single setting member consists of a rail which performs a rocking movement during a case shift operation of the machine, and in which a frame is provided in which the setting member is pivotally mounted, said frame moving along with the setting member during the drive of the setting member by the actuator parts, and means are provided to transmit the movement of the frame to the abutment determining the travel of the movable pawl.

5. A typewriter according to claim 1, in which the different positions of the actuator parts on the key-actuated parts are obtained by utilizing members of different shapes.

6. A typewriter according to claim 1, in which the different positions of the actuator parts on the key-actuated parts are obtained by differently located members of the same shape.

7. A typewriter according to claim 1, in which a frame is provided for the single setting member and the actuator parts for obtaining different travel movements of the frame and of the abutment are arranged at different distances from the setting member on the key-actuated parts.

8. A typewriter according to claim 1, in which a frame is provided for the single setting member and the actuator parts for obtaining different travel movements of the frame and of the abutment are arranged at different distances from the single setting member on the key-actuated parts, and in which an adjustable pawl carrier is provided the movement of which is controlled by the abutment, the movable escapement pawl being mounted on the pawl carrier.

9. A typewriter according to claim 1, in which a frame is provided for the single setting member and the actuator parts for obtaining different travel movements of the frame and of the abutment are arranged at different distances from the single setting member on the key-actuated parts, and in which an adjustable pawl carrier and a stop are provided wherein the movable escapement pawl pivots on the pawl carrier by an amount limited by the stop to obtain a single escapement step, a larger escapement step being obtained by a displacement of the pawl carrier controlled by the adjustable abutment.

10. A typewriter according to claim 1, in which the adjustable abutment is provided with a plurality of notches to obtain different strokes of the movable pawl.

EUGEN BUSCHMANN.